United States Patent [19]

Mark et al.

[11] Patent Number: 4,554,330

[45] Date of Patent: Nov. 19, 1985

[54] POLYESTERCARBONATES EXHIBITING IMPROVED HEAT RESISTANCE FROM CYCLOALKYLIDENE DIPHENOL

[75] Inventors: Victor Mark, Evansville; Charles V. Hedges, Mt. Vernon, both of Ind.

[73] Assignee: General Electric Company, Mt. Vernon, Ind.

[21] Appl. No.: 621,472

[22] Filed: Jun. 18, 1984

Related U.S. Application Data

[63] Continuation-in-part of Ser. No. 453,105, Dec. 17, 1982, abandoned.

[51] Int. Cl.$^4$ .................... C08G 63/64; C08L 67/02; C08L 69/00
[52] U.S. Cl. ................................ 525/462; 525/469; 528/176; 528/193; 528/196; 528/202; 528/204
[58] Field of Search ............. 528/176, 196, 202, 204, 528/193; 525/462, 469

[56] References Cited

U.S. PATENT DOCUMENTS

| | | |
|---|---|---|
| 3,422,065 | 1/1969 | Wulff et al. . |
| 4,129,546 | 12/1978 | Axelrod et al. . |
| 4,299,948 | 11/1981 | Weirauch et al. . |
| 4,304,899 | 12/1981 | Mark et al. . |
| 4,310,652 | 1/1982 | DeBona et al. ................. 528/176 |

Primary Examiner—Harold D. Anderson
Attorney, Agent, or Firm—Myron B. Kapustij; Martin B. Barancik

[57] ABSTRACT

Linear thermoplastic polycarbonates derived from:
(i) a carbonate precursor; and
(ii) at least one dihydric phenol represented by the general formula

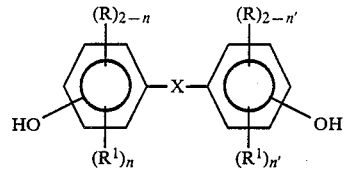

wherein
R is independently selected from hydrogen and lower alkyl radicals,
X is selected from monocyclic cycloalkylidene radicals containing from 8 to about 16 ring carbon atoms, and
n and n' are independently selected from whole numbers having a value of from 0 to 2 inclusive, with the proviso that the sum of n plus n' is at least one.

14 Claims, No Drawings

POLYESTERCARBONATES EXHIBITING IMPROVED HEAT RESISTANCE FROM CYCLOALKYLIDENE DIPHENOL

RELATED APPLICATIONS

This application is a continuation-in-part application of copending application Ser. No. 453,105, filed Dec. 17, 1982, now abandoned.

BACKGROUND OF THE INVENTION

Polycarbonates are well known thermoplastic materials which due to their many advantageous properties find use as thermoplastic engineering materials in many commercial and industrial applications. The polycarbonates exhibit, for example, excellent properties of toughness, flexibility, impact resistance, and heat resistance. The polycarbonates are generally prepared by the co-reaction of a dihydric phenol such as bisphenol-A with a carbonate precursor such as phosgene.

While presently available conventional polycarbonates are quite useful in a wide range of applications there nevertheless exists a need, especially in applications involving high temperature environments, for polycarbonates exhibiting greater heat resistance than that possessed by conventional polycarbonates.

It is, therefore, an object of the instant invention to provide polycarbonates which exhibit improved heat resistance.

SUMMARY OF THE INVENTION

In accordance with the instant invention there are provided linear polycarbonate resins which exhibit improved heat resistance.

These polycarbonates are comprised of at least one repeating structural unit represented by the general formula

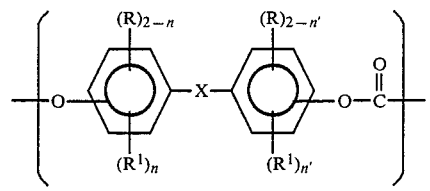

wherein:
R is independently selected from hydrogen and alkyl radicals;
$R^1$ is independently selected from halogen radicals;
X is selected from monocyclic cycloalkylidene radicals containing from 8 to about 16 ring carbon atoms; and
n and n' are independently selected from whole numbers having a value of from 0 to 2 inclusive, with the proviso that the sum of n plus n' is at least one.

DESCRIPTION OF THE INVENTION

It has been discovered that linear carbonate polymers can be obtained which exhibit improved heat resistance as compared to conventional polycarbonates.

These polycarbonates are derived from:
(i) a carbonate precursor; and
(ii) at least one dihydric phenol represented by the general formula

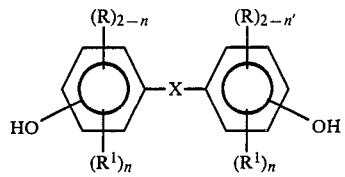

wherein:
R is independently selected from hydrogen and alkyl radicals;
$R^1$ is independently selected from halogen radicals;
n and n' are independently selected from whole numbers having a value of from 0 to 2 inclusive, with the proviso that the sum of n plus n' is at least one; and
X is selected from monocyclic cycloalkylidene radicals containing from 8 to about 16 ring carbon atoms.

The preferred alkyl radicals represented by R are the lower alkyl radicals, preferably those containing from 1 to about 4 carbon atoms, e.g., methyl, ethyl, propyl, isopropyl, and the like.

The preferred halogen radicals represented by $R^1$ are selected from chlorine, bromine, and fluorine, with bromine and chlorine being the more preferred halogen radicals.

Preferably X is selected from monocyclic cycloalkylidene radicals containing from 10 to about 16 ring carbon atoms. More prefreably X is selected from monocyclic cycloalkylidene radicals containing from 11 to about 16 ring carbon atoms. Most preferably X is selected from monocyclic cycloalkylidene radicals containing from 12 to about 16 ring carbon atoms.

Particularly useful dihydric phenols of Formula I are those wherein X is a cycloalkylidene radical containing from 12 to about 14 ring carbon atoms.

Preferred dihydric phenols of Formula I are those represented by the general formula

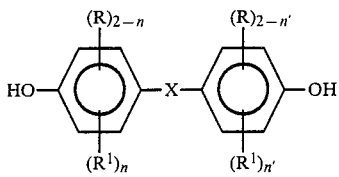

wherein X, R, $R^1$, n and n' are as defined hereinafore.

Preferably X in Formula Ia represents a monocyclic cycloalkylidene radical containing from 10 to about 16 ring carbon atoms, more preferably from 11 to about 16 ring carbon atoms, and most preferably from 12 to about 16 ring carbon atoms.

Preferred compounds of Formula Ia are those wherein $R^1$ and R, when R is an alkyl radical, are in the ortho positions relative to the hydroxyl radicals.

The more preferred compounds of Formula Ia are those wherein R is hydrogen n and n' are both at least one, and the halogen substituents represented by $R^1$ are in the ortho positions relative to the hydroxyl radicals. In these dihydric phenols X is preferably a cycloalkylidene radical containing from 10 to about 16 ring carbon atoms, more preferably from 11 to about 16 ring carbon atoms, and most preferably from 12 to about 16 ring carbon atoms.

Particularly useful dihydric phenols of Formula Ia are those represented by the general formula

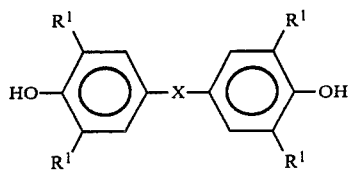

wherein X and $R^1$ are as defined hereinafore. Preferably X in Formula Ib contains from 10 to about 16 ring carbon atoms, more preferably from 11 to about 16 ring carbon atoms, and most preferably from 12 to about 16 ring carbon atoms.

The term monocyclic as used herein with respect to the cycloalkylidene radicals represented by X is meant to specify that the cycloalkylidene radicals contain only one ring, i.e., they are non-polycyclic. Thus these non-polycyclic cycloalkylidene radicals do not include those cycli groups which are non monocyclic, e.g., bicyclic, bridged, or fused cyclic structures such as 2-norbornylidene, bicyclo(3.3.0)octylene, and decahydronaphthylene.

Some illustrative non-limting examples of dihydric phenols of Formula Ia, wherein R and $R^1$ are in the ortho positions relative to the hydroxyl radicals, include:

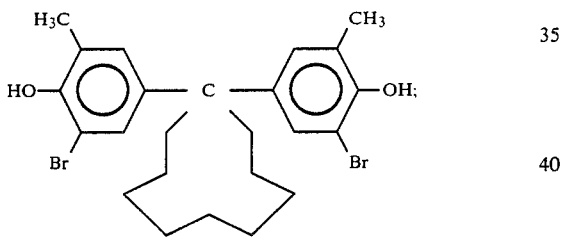

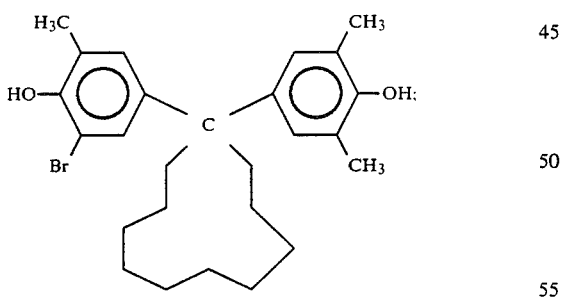

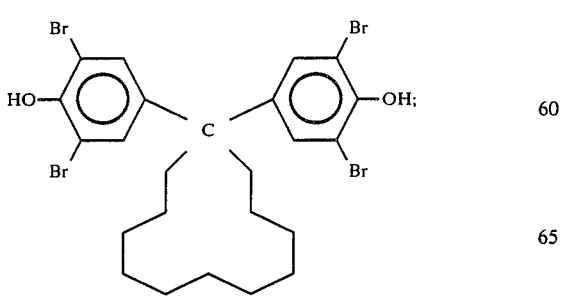

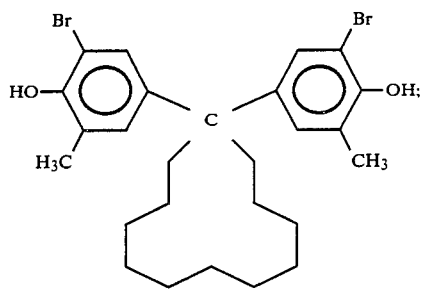

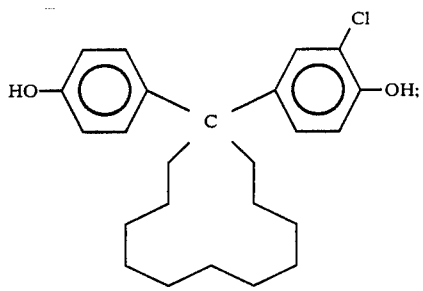

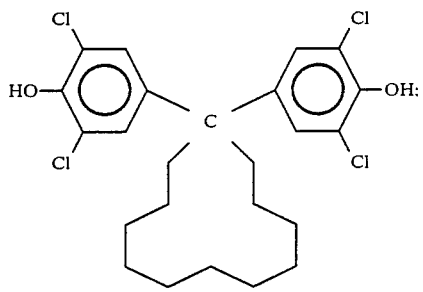

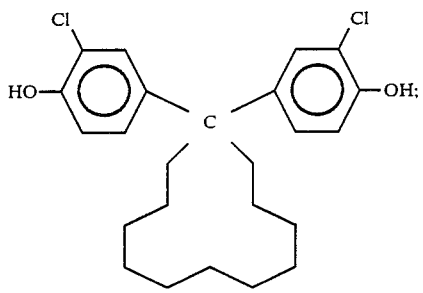

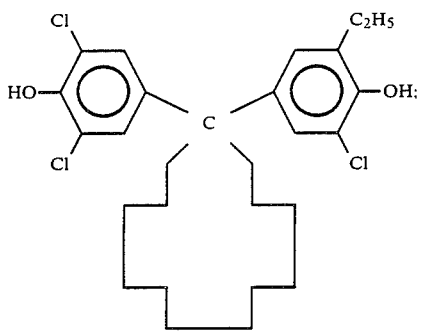

-continued

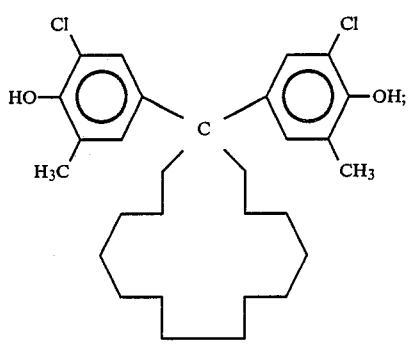

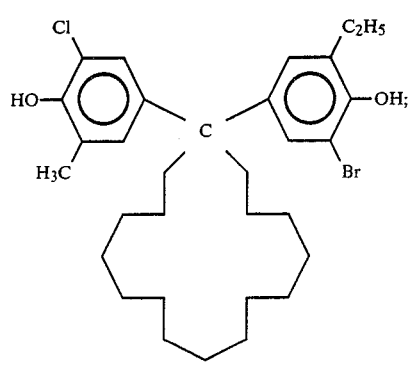

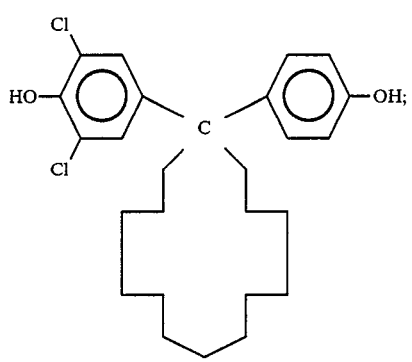

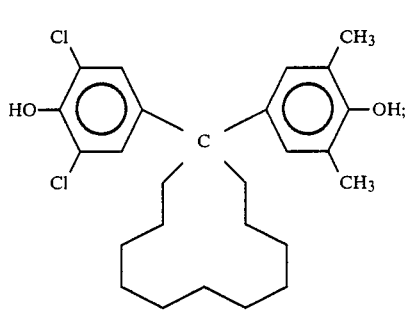

and

-continued

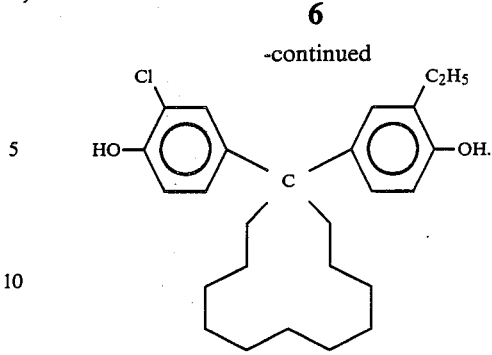

The dihydric phenols of Formula I may be prepared by reacting a particular ketone with a phenol to form a dihdyric phenol, and thereafter halogenating this dihydric phenol. The ketone is reacted with the phenol in the presence of an acid catalyst and preferably in the presence of an acid catalyst and a cocatalyst such as butyl mercaptan.

The particular ketone reactant is selected from ketones represented by the general formula

wherein X is as defined hereinafore. More particularly, the ketone of Formula II may be represented by the general formula

wherein Y is selected from alkylene radicals containing from 7 to about 15 carbon atoms which together with the

radical form a cyclic structure containing from 8 to about 16 ring carbon atoms.

The phenol reactants are selected from phenols represented by the general formulae

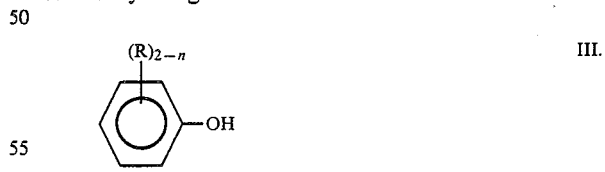

and

wherein R, n and n' are as defined hereinafore.

In order to obtain the novel dihydric phenols of Formula I one mole of the ketone of Formula II is reacted with two moles of the phenol reactants in the presence of an acid catalyst, and preferably in the presence of an acid catalyst and a cocatalyst such as butyl mercaptan. Generally, the phenol reactants are present in excess.

Some illustrative non-limiting examples of suitable acid catalysts that may be employed include hydrochloric acid, hydrobromic acid, poly(styrene sulfonic acid), sulfuric acid, benzene sulfonic acid, and the like. The phenols are reacted with the ketone under conditions of temperature and pressure, and in the presence of the acid catalyst, such that coreaction between the phenols and said ketone will occur to form the dihydric phenol. Generally, the reaction proceeds statisfactorily at about one atmosphere of pressure and at temperatures of from room temperature (25° C.) to about 100° C.

The amount of the acid catalyst employed is a catalytic amount. By catalytic amount is meant an amount effective to catalyze the reaction between the ketone and the phenols to produce the dihydric phenol. Generally, this amount is in the range of from about 0.1 to about 10 percent. However, in actual practice it is usually higher since the water coproduct formed in the reaction dilutes the acid catalyst and renders it somewhat less effective (slowing the reaction) than in its undiluted state.

The dihydric phenol intermediate formed by the coreaction of the ketone and the phenols is then halogenated in accordance with well known conventional halogenation procedures to form the dihydric phenol of Formula I.

Another method by which some of the dihydric phenols of Formula I may be prepared involves reacting a ketone of Formula I with dihydric phenols represented by the general formula

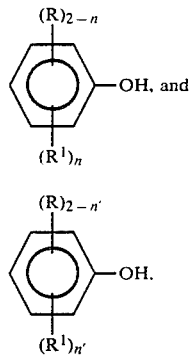

wherein n, n', R and $R^1$ are as defined hereinafore, in the presence of a catalytic amount of an acid catalyst. In this method the dihydric phenol of Formula I is formed directly with no need to halogenate an intermediate dihydric phenol.

In the preparation of the carbonate polymers of the instant invention only one dihydric phenol of Formula I may be employed, or a mixture of two or more different dihydric phenols of Formula I may be employed.

The carbonate precursor that is reacted with the dihydric phenol of Formula I may be a carbonyl halide, a diaryl carbonate, or a bishaloformate. The preferred carbonate precursors are the carbonyl halides. The carbonyl halides are selected from carbonyl chlroide, carbonyl bromide, and mixtures thereof. The preferred carbonyl halide is carbonyl chloride, also known as phosgene.

The novel linear carbonate polymers of the instant invention contain at least one recurring structural unit represented by the general formula

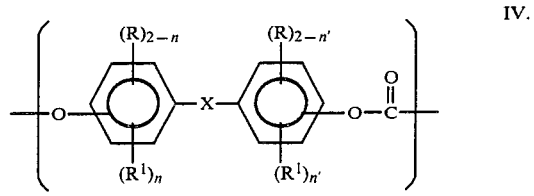

wherein n, n', R, $R^1$, and X are as defined hereinafore. Preferred linear carbonate polymers containing at least one repeating structural unit of Formula IV are those wherein X is selected from monocyclic cycloalkylidene radicals containing from 10 to about 16 ring carbon atoms, preferably from 11 to about 16 ring carbon atoms, and more preferably from 12 to about 16 ring carbon atoms.

In order for the polycarbonates of the instant invention to exhibit improved heat resistances it is critical that at least one halogen atom be present on at least one of the aromatic rings of the recurring strutural unit represented by Formula IV, i.e., that the sum of n plus n' be at least one.

These high molecular weight linear aromatic carbonate polymers generally have a number average molecular weight from about 5,000 to about 200,000, preferably from about 10,000 to about 100,000.

Also included hwrwin are the thermoplastic randomly branched polycarbonates. These randomly branched polycarbonates may be prepared by the reaction of (i) a carbonate precursor, (ii) at least one dihydric phenol of Formula I, and (iii) a minor amount of a polyfunctional organic compound. The polyfunctional organic compound is generally aromatic in nature and functions as a branching agent. This polyfunctional aromatic compound contains at least three functional groups selected from hydroxyl, carboxyl, haloformyl, carboxylic anhydride, and the like. Some typical polyfunctional compounds are disclosed in U.S. Pat. Nos. 3,635,895 and 4,001,184, which are hereby incorporated by reference. Some illustrative non-limiting examples of these polyfunctional aromatic compounds include trimellitic anhydride, trimellitic acid, trimellityl trichloride, mellitic acid, and the like.

The methods for preparing the instant polycarbonates are the conventional methods for preparing polycarbonates and include solution polymerization, melt polymerization, transesterification, and the like.

One method of preparing the high molecular weight aromatic carbonate polymers of the instant invention involves the heterogeneous interfacial polymerization process. This process is well known to those skilled in the art. Another useful method for preparing the instant polycarbonates involves the use of an organic solvent system such as pyridine. This process is likewise well known to those skilled in the art.

The carbonate polymers of the instant invention may optionally have admixed therewith certain commonly known and used additives such as antioxidants; antistatic agents; fillers such as glass fibers, mica, talc, clay, and the like; impact modifiers such as polyacrylates, polyolefins, rubbery dienic polymers, styrenic polymers, silcone rubbers, polysiloxane-polycarbonate copolymers, and the like; ultraviolet radiation absorbers such as the benzophenones, benzotriazoles, cyanoacrylates, and the like; hydrolytic stabilizers such as the epoxides disclosed in U.S. Pat. Nos. 3,489,716, 4,138,379 and 3,839,247, all of which are hereby incorporated by reference; color stabilizers such as the organophosphites disclosed in U.S. Pat. Nos. 3,305,520 and 4,118,730, both of which are hereby incorporated herein by reference; flame retardants; and the like.

Although the instant polycarbonates exhibit some degree of flame retardancy, and those polycarbonates derived from tetrahalogenated dihydric phenols are flame retardant per se, they may nevertheless have admixed therewith flame retardant additives to improve their flame retardant properties. Some particularly useful flame retardants include the alkali and alkaline earth metal salts of sulfonic acids. These types of flame retardants are disclosed, inter alia, in U.S. Pat. Nos. 3,775,367; 3,836,490; 3,933,374; 3,948,851; 3,926,908; 3,919,167; 3,909,490; 3,953,396; 3,831,100; 3,978,024; 3,953,399; 3,917,559; 3,951,810 and 3,940,366, all of which are incorporated herein by reference.

Any material known to impact modify aromatic polycarbonate, particularly polycarbonate resins derived from bisphenol-A, should be useful in upgrading the impact properties of the instant polycarbonates. Examples of these impact modifiers include but are not limited to the following general categories:
polyacrylates;
polyolefins;
rubbery dienic polymers;
styrenic polymers;
organic silicone rubbers;
polysiloxane-polycarbonate block copolymers; and
elastomeric polyesters.

Some of these impact modifiers are disclosed in U.S. application Ser. No. 452,909, filed Dec. 27, 1982, which is incorporated herein by reference.

The polyacrylates which can be employed as impact modifiers are rubbery homopolymers or copolymers. In general the polyalkyl acrylates described in Brinkmann et al., U.S. Pat. No. 3,591,659, incorporated by reference, can be used, especially those containing units derived from alkyl acrylates, particularly n-butyl acrylate. Acrylate containing copolymers wherein the other monomer is, for example, derived from a methacrylate are also readily employable, see for example Japanese Patent Application Announcement No. 1968-18611, incorporated by reference. Preferably the acrylate resin will be in the form of a rubber-elastic graft copolymer having a glass transition temperature below about −20° C., preferably below about −40° C. Schlichting, U.S. Pat. No. 4,022,748, incorporated herein by reference. More preferably, the acrylate resin will comprise a multistage polymer having a rubbery first stage (core) and a thermoplastic hard final stage (shell), see Farnham U.S. Pat. No. 4,096,202, incorporated by reference.

The polyolefins which may be employed as impact modifiers are homopolymers or copolymers. The polymers include the standard high density polymers, low density polymers as well as the new linear low density polyolefins such as the linear low density polyethylene made with butene-1 or octene-1.

Various rubbery polymers such as polybutadiene, polyisoprene, styrene-butadiene, and the like may also be employed as impact modifiers.

Styrene containing polymers can also be employed as impact modifiers of the instant polycarbonates. Examples of such polymers include acrylonitrile-butadiene-styrene, styrene-acrylonitrile, methacrylate-butadiene-styrene, and the like.

Any minimum quantity of impact modifier which positively upgrades the impact strength of the polycarbonates of the instant invention can be employed. Greater than this minimum quantity may be employed so long as the properties desired for a particular application of the instant polycarbonates are substantially maintained. Generally a minimum of two weight percent is sufficient to observe an increase. A minimum of about four weight percent is preferred. A level of about 15 weight percent, preferably about 10 weight percent, generally should not be exceeded. Weight percent is measured as the amount of impact modifier in the total of impact modifier plus polycarbonate resin.

Another embodiment of the instant invention is a carbonate copolymer obtained by reacting (i) a carbonate precursor, (ii) at least one dihydric phenol of Formula I, and (iii) at least one dihydric phenol represented by the general formula

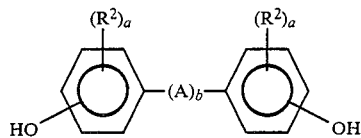 V.

wherein:
$R^2$ is independently selected from halogen, monovalent hydrocarbon, and monovalent hydrocarbonoxy radicals;
a is independently selected from whole numbers having a value of from 0 to 4 inclusive;
b is either zero or one; and
A is selected from alkylene radicals, alkylidene radicals, cycloalkylene and cycloalkylidene radicals containing from 4 to 6 ring carbon atoms, —S—, —S—S—, —O—,

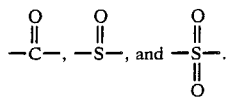

The preferred halogen radicals represented by $R^2$ are chlorine and bromine.

The monovalent hydrocarbon radicals represented by $R^2$ are the alkyl radicals, the aryl radicals, the aralkyl radicals, the alkaryl radicals, and the cycloalkyl radicals. The preferred alkyl radicals represented by $R^2$ are those containing from 1 to about 8 carbon atoms. Some illustrative non-limiting examples of these alkyl radicals include methyl, ethyl, propyl, isopropyl, butyl, isobutyl, tertiary butyl, pentyl, neopentyl, and the like. The preferred aryl radicals represented by $R^2$ are those containing from 6 to 12 carbon atoms, i.e., phenyl, naphthyl, and biphenyl. The preferred aralkyl and alkaryl radicals represented by $R^2$ are those containing from 7 to about 14 carbon atoms. Some illustrative non-limiting examples of these aralkyl and alkaryl radicals include benzyl, tolyl, ethylphenyl, and the like. The preferred cycloalkyl radicals represented by $R^2$ are those containing from 4 to about 6 ring carbon atoms and include cyclobutyl, cyclopentyl, cyclohexyl, methycyclohexyl, and the like.

The monovalent hydrocarbonoxy radicals represented by $R^2$ are preferably selected from alkoxy radicals and aryloxy radicals. The preferred alkoxy radicals represented by $R^2$ are those containing from 1 to about 8 carbon atoms. Some illustrative non-limiting examples of these alkoxy radicals include methoxy, butoxy, isopropxy, propoxy, and the like. The preferred aryloxy radical is phenoxy.

Preferably $R^2$ is independently selected from monovalent hydrocarbon radicals, with the alkyl radicals being the preferred monovalent hydrocarbon radicals.

The preferred alkylene radicals represented by A are those containing from 2 to about 6 carbon atoms. Some illustrative non-limiting examples of these alkylene radicals include ethylene, propylene, butylene, and the like. The preferred alkylidene radicals represented by A are those containing from 1 to about 6 carbon atoms. Some illustrative non-limiting examples of these alkylidene radicals include ethylidene, 1,1-propylidene, 2,2-propylidene, and the like.

The preferred dihydric phenols of Formula V are those wherein b is one and A is selected from alkylene or alkylidene radicals.

In the dihydric phenols of Formula V when more than one $R^2$ substituent is present on the aromatic nuclear residue they may be the same or different.

The more preferred dihydric phenols of Formula V are the 4,4'-bisphenols.

The dihydric phenols of Formula V are well known in the art and are generally commercially available or may be readily prepared by known methods. These phenols are generally used in the preparation of conventional prior art polycarbonates.

Some non-limiting illustrative examples of the dihydric phenols of Formula V include:
2,2-bis(4-hydroxyphenyl)propane (bisphenol-A);
1,1-bis(3-methy-4-hydroxyphenyl)ethane;
2,2-bis(3,5-dimethyl-4-hydroxyphenyl)propane;
2,2-bis(3,5-dibromo-4-hydroxyphenyl)propane;
bis(4-hydroxyphenyl)sulfide;
1,1-bis(4-hydroxyphenyl)cyclohexane;
3,3-bis(3-methyl-4-hydroxyphenyl)pentane;
3,3'-diethyl-4,4'-dihydroxydiphenyl; and the like.

The amount of dihydric phenol of Formula I utilized in this embodiment may generally be from about 1 to about 99 weight percent, preferably from about 5 to about 90 weight percent, and more preferably from about 10 to about 80 weight percent, based on the total amounts of dihydric phenols I and V employed.

The preferred dihydric phenol of Formula V is bisphenol-A.

The carbonate copolymers obtained by reacting (i) a carbonate precursor, (ii) at least one dihydric phenol of Formula I, and (iii) at least one dihydric phenol of Formula V will contain at least the following repeating structural units:

IV; and

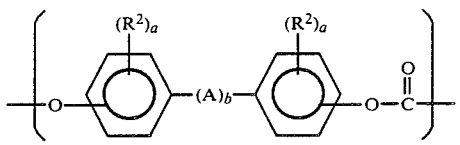

VI.

wherein A, $R^2$, b and a are as defined hereinafore.

In the practice of the instant invention only one dihydric phenol of Formula V may be employed or a mixture of two or more different dihydric phenols of Formula V may be utilized.

The procedures for preparing the copolymers of this embodiment are generally similar to those used for producing the polycarbonates of the instant invention as described hereinafore. The instant carbonate copolymers may optionally have admixed therewith the various additives described hereinafore.

Yet another embodiment of the instant invention is a polycarbonate resin blend comprised of (i) at least one polycarbonate derived from (a) at least one dihydric phenol of Formula I, and (b) a carbonate precursor (hereinafter referred to as polymer A); and (ii) at least one conventional polycarbonate resin derived from (a) at least one dihydric phenol of Formula V, and (b) a carbonate precursor (hereinafter referred to as resin B). These blends may contain from 1 to about 99 weight percent of polymer A, preferably from about 5 to about 90 weight percent of polymer A, and more preferably from about 10 to about 80 weight percent of polymer A, based on the total amount of polymer A and resin B present in the blends.

The blends of the instant invention may optionally have admixed therewith the aforementioned additives.

The instant blends may generally be prepared by first preforming polymer A and resin B and thereafter physically mixing or blending these resins together.

Still another embodiment of the instant invention are copolyester-carbonates derived from (i) a carbonate precursor, (ii) at least one dihydric phenol of Formula I, and (iii) at least one difunctional carboxylic acid or an ester forming reactive derivative thereof.

Briefly stated, the copolyester-carbonates comprise recurring carbonate groups, carboxylate groups, and aromatic carbocyclic groups in the linear polymer chain, in which at least some of the carboxylate groups and at least some of the carbonate groups are bonded directly to the ring carbon atoms of the aromatic carbocyclic groups.

These copolyester-carbonates contain ester bonds and carbonate bonds in the polymer chain, wherein the amount of ester bonds is from about 25 to about 90 mole percent, preferably from about 35 to about 80 mole percent. For example, 5 moles of bisphenol-A reacting completely with 4 moles of isophthaloyl dichloride and one mole of phosgene would give a copolyester-carbonate of 80 mole percent ester bonds.

Conventional copolyester-carbonates in general, and methods for their preparation, are disclosed in U.S. Pat. No. 3,169,121, which is hereby incorporated by reference.

In general, any difunctional carboxylic acid conventionally used in the preparation of linear polyesters may be utilized in the preparation of the linear copolyester-carbonate resins of the present invention. The carboxylic acids which may be used include the aliphatic carboxylic acids, aliphatic-aromatic carboxylic acids, and aromatic carboxylic acids. These acids are disclosed in the aforementioned U.S. Pat. No. 3,169,121.

The difunctional carboxylic acids which may be utilized in the preparation of the copolyester-carbonates of the instant invention generally conform to the general formula $$R^3-(R^4)_q-COOH \qquad \text{VII}$$

wherein $R^4$ is an alkylene, alkylidene, aralkylene, aralkylidene or cycloaliphatic group containing ethylenic unsaturation; an aromatic group such as phenylene, biphenylene, substituted phenylene, and the like; two or more aromatic groups connected through non-aromatic linkages such as alkylene or alkylidene groups; and the like. $R^3$ is either a carboxyl group or a hydroxyl group. The letter q represents one where $R^3$ is a hydroxyl group and either zero or one where $R^3$ is a carboxyl group.

Preferred difunctional carboxylic acids are the aromatic difunctional carboxylic acids, i.e., those acids of Formula VII where q is one, $R^3$ is a carboxyl or hydroxyl group, and $R^4$ is an aromatic group such as phenylene, naphthylene, biphenylene, substituted phenylene, and the like. The preferred aromatic difunctional carboxylic acids are those represented by the general formula

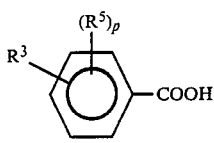

VIII.

wherein $R^3$ is as defined above; $R^5$ is independently selected from halogen radicals, monovalent hydrocarbon radicals, and monovalent hydrocarbonoxy radicals; and p represents a whole number having a value of from 0 to 4 inclusive.

The preferred radicals represented by $R^5$ are the same as those disclosed for $R^2$ hereinafore.

Mixtures of two or more different difunctional carboxylic acids may be employed as well as individual difunctional carboxylic acids. Therefore, where the term difunctional carboxylic acid is used herein it is meant to include mixtures of two or more different difunctional carboxylic acids as well as individual difunctional carboxylic acids.

Particularly useful aromatic difunctional carboxylic acids are isophthalic acid, terephthalic acid, and mixtures thereof.

Rather than utilizing the difunctional carboxylic acids per se it is preferred to employ their ester forming reactive derivatives such as, for example, the acid halides. Particularly useful acid halides are the acid chlorides. Thus, for example, instead of using isophthalic acid, terephthalic acid, or mixtures thereof it is preferred to utilize isophthaloyl dichloride, terephthaloyl dichloride, or mixtures thereof. A particularly useful mixture of isophthaloyl dichloride and terephthaloyl dichloride is one wherein the weight ratio of isophthaloyl dichloride to terephthaloyl dichloride is in the range of from 1:10 to 9.8:0.2.

The instant copolyester-carbonate resins may be prepared by any of the known conventional means such as solution polymerization, melt polymerization, transesterification, and the like. One of the methods of preparing the copolyester-carbonates of this invention involves the heterogeneous polymerization system utilizing an aqueous caustic solution, an organic water immiscible solvent, at least one dihydric phenol of Formula I, at least one difunctional carboxylic acid or an ester forming reactive derivative thereof, a catalyst, a molecular weight regulator, and a carbonate precursor. A preferred heterogeneous interfacial polymerization system is one which utilizes phosgene as the carbonate precursor and methylene chloride or chlorobenzene as the organic solvent.

The reaction conditions, catalysts, and chain terminators or molecualr weight regulators utilized are generally the same as those used in the preparation of conventional prior art copolyester-carbonates and are well known to those skilled in the art.

The linear copolyester-carbonate resins of the instant invention may also optionally contain admixed therewith the various additives described supra, particularly an impact modifying amount of at least one impact modifier.

Another embodiment of the instant invention is a copolyester-carbonate resin derived from (i) a carbonate precursor, (ii) at least one difunctional carboxylic acid or an ester forming reactive derivative thereof, (iii) at least one dihydric phenol of Formula I, and (iv) at least one dihydric phenol of Formula V. Generally, the amount of dihydric phenol of Formula I employed in the preparation of this copolyester-carbonate may be from about 1 to about 99 weight percent, preferably from about 5 to about 90 weight percent, and more preferably from about 10 to about 80 weight percent, based on the total of dihydric phenols of Formulae I and V used.

These resins may also optionally have admixed therewith the aforedescribed additives, particularly an impact modifying amount of at least one impact modifier.

Still another embodiment of the instant invention is a copolyester-carbonate blend comprised of (i) at least one linear copolyester-carbonate resin of the instant invention, i.e., one derived from (a) a carbonate precursor, (b) at least one difunctional carboxylic acid or an ester forming reactive derivative thereof, and (c) at least one dihydric phenol of Formula I (hereinafter referred to as copolyester-carbonate resin C); and (ii) at least one conventional copolyester-carbonate resin which is derived from (a) a carbonate precursor, (b) at least one difunctional carboxylic acid or an ester forming reactive derivative thereof, and (c) at least one dihydric phenol of Formula V (hereinafter referred to as copolyester-carbonate resin D).

The blends of this embodiment may contain from about 1 to about 99 weight percent of resin C, preferably from about 5 to about 90 weight percent of resin C, and more preferably from about 10 to about 80 weight percent resin C, based on the total amounts of resins C and D present in these blends.

These blends may also optionally contain the various aforedescribed additives, particularly an impact modifying amount of at least one impact modifier.

Also included within the scope of the instant linear copolyester-carbonates are the randomly branched linear copolyester-carbonates. These branched copolyester-carbonates may be prepared by the use of the branching agents described hereinafore for the preparation of the randomly branched polycarbonates.

The high molecular weight linear aromatic copolyester-carbonates of the instant invention generally have a number average molecular weight in the range of from about 5,000 to about 200,000, preferably from about 10,000 to about 100,000.

The term linear polycarbonate resins, as used with respect to the polycarbonates of the instant invention, includes both the branched polycarbonates and the non-branched polycarbonates of the instant invention.

Likewise, the term linear copolyester-carbonate resins, as used with respect to the copolyester-carbonates of the instant invention, includes both the branched copyester-carbonates and the non-branched copolyester-carbonates of the instant invention.

Also included within the scope of the instant invention are blends of the copolyester-carbonates of the instant invention (copolyester-carbonate resins C) with the polycarbonates of the instant invention (polycarbonate resins A); blends of copolyester-carbonates of the instant invention (copolyester-carbonate resins C) with conventional polycarbonates (polycarbonate resins B); and blends of the polycarbonates of the instant invention (polycarbonate resins A) with conventional copolyester-carbonates (copolyester-carbonate resins D).

These blends may generally contain from about 1 to about 99 weight percent of the copolyester-carbonate resin and from about 99 to about 1 weight percent of the polycarbonate resin, preferably from about 5 to about 95 weight percent of the copolyester-carbonate resin and from about 95 to about 5 weight percent of the polycarbonate resin. These blends may optionally contain the aforedescribed additives, particularly an impact modifying amount of at least one impact modifier.

DESCRIPTION OF THE PREFERRED EMBODIMENT

In order to more fully and clearly illustrate the present invention the following examples are set forth. It is intended that the examples be considered as illustrative rather than limiting the invention as disclosed and claimed herein. In the examples all parts and percents are on a weight basis unless otherwise indicated.

The following example illustrates the preparation of a dihydric phenol intermediate which is halogenated to produce the dihydric phenols of the instant invention. This dihydric phenol falls outside the scope of the instant invention.

EXAMPLE 1

This example illustrates the preparation of 1,1-bis(4-hydroxyphenyl)cyclododecane intermediate used in the preparation of the instant dihydric phenols.

To a 3 liter round bottom flask equipped with a stirrer, reflux condenser, thermometer and gas inlet tube, there are charged 1647 grams (17.4 moles) of phenol, 478 grams (2.62 moles) of cyclododecanone, and 15 milliliters of n-butyl mercaptan. Heat is applied via a heating mantel and when the reaction mixture becomes liquid at 58° C. andhydrous hydrogen chloride is introduced until the solution becomes saturated. Stirring is continued between 52°-60° C. for several hours, during which period white solids begin to separate out from the reddish-orange reaction mixture. When gas chromatographic analysis of samples removed from the slurry indicates the absence of the macrocyclic ketone, the warm reaction slurry is filtered by suction and the resultant filter cake is washed with methylene chloride. The filter cake is the slurried up with fresh methylene chloride, is filtered and is rinsed with more solvent. Analysis by gas chromatography of the dried filter cake, which weighs 849.8 garms (2.41 moles), corresponding to a 92° yield, and melts as 207°-208.5° C., indicates that it has a retention time of 26.07 minutes realtive to p-cumyl phenol which emerges at 13.91 minutes.

The following examples illustrate the preparation of the dihydric phenols of the instant invention.

EXAMPLE 2

This example illustrates the preparation of 1,1-bis(3,5-dibromo-4-hydroxyphenyl)cyclododecane.

To a slurry containing 10 grams (0.0284 mole) of 1,1-bis(4-hydroxyphenyl)cyclododecane, prepared substantially in accordance with the procedure of Example 1, and 50 milliliters of methylene chloride there is added, dropwise, a solution containing 19.0 grams (0.1135 mole) of bromine and 10 milliliters of methylene chloride. The addition of this solution is carried out while maintaining the temperature of the slurry at 23° C. and with stirring. As the bromine addition progresses the slurry turns to a solution. Upon further progression of the bromine addition this solution turns into a slurry. The reaction is followed by gas chromatographic analysis of samples removed from the reaction mixture. When analysis of these samples indicates the absence of the 1,1-bis(4-hydroxyphenyl)cyclododecane the slurry is filtered by suction and the resultant solids are rinsed with methylene chloride. The solids are recrystallized from methanol. The solids, which are 1,1-bis(3,3-dibromo-4-hydroxyphenyl)cyclododecane, have a melting point of 269°-271° C., and have a gas chromatographic retention time of 31.98 minutes relative to p-cumyl phenol which emerges at 14.01 minutes.

EXAMPLE 3

This example illustrates the preparation of 1,1-bis(3-chloro-4-hydroxyphenyl)cyclododecane.

To a slurry containing 10 grams (0.0284 mole) of 1,1-bis(4-hydroxyphenyl)cyclododecane, prepared substantially in accordance with the procedure of Example 1, and 50 milliliters of methylene chloride, there is slowly added, at a temperature of 25°-27° C. and with stirring, a solution containing 26 grams (0.19 mole) of sulfuryl chloride and 20 milliliters of methylene chloride. During the addition of this solution the slurry turns to a solution. The reaction is followed by gas chromatographic analysis of samples removed from the reaction mixture. When analysis of these samples indicates the absence of the 1,1-bis(4-hydroxyphenyl)cyclododecane the solution is stripped on a rotary evaporator under water aspirator vacuum. Analysis of the solids indicates that they contain 93.6% of 1,1-bis(3-chloro-4-hydroxyphenyl)cyclododecane; 6% of 1-(4-hydroxyphenyl), 1-(3-chloro - 4-hydroxyphenyl)cyclododecane; and 0.4% of 1-(3-chloro-4-hydroxyphenyl),1-(3,5-dichloro-4-hydroxyphenyl)cyclododecane. The solids are recrystallized from methanol to yield the pure 1,1-bis (3-chloro-4-hydroxyphenyl)cyclododecane, which has a melting point of 167°-169° C. and a gas chromatographic retention time of 28.04 minutes relative to 13.97 minutes for p-cumyl phenol.

EXAMPLE 4

This example illustrates the preparation of 1,1-bis(3-bromo - 5-methyl-4-hydroxyphenyl)cyclododecane.

To a slurry containing 2.5 grams (0.0066 mole) 1,1-bis(3-methyl-4-hydroxyphenyl)cyclododecane and 50 milliliters of methylene chloride there is slowly added, at 23° C. and with stirring, a solution containing 3.36 grams (0.021 mole) bromine and 10 milliliters of methylene chloride. During addition of this solution the slurry turns into a solution. The reaction is followed by gas chromatographic analysis of samples removed from the reaction mixture. When analysis of these samples indicates the absence of 1,1-bis(3-methyl-4-hydroxyphenyl)cyclododecane the solution is stripped on a rotary evaporator under water aspirator vacuum. The resultant solids are recrystallized from methanol. The resulting white crystals have a melting point of 237°–238° C. and a gas chromatographic retention time of 29.71 minutes relative to a retention time of 14.01 minutes for p-cumyl phenol.

EXAMPLE 5

This example illustrates the preparation of 1,1-bis(3-chloro-5-methyl-4-hydroxyphenyl)cyclododecane.

To a slurry containing 3 grams (0.0079 mole) of 1,1-bis(3-methyl-4-hydroxyphenyl)cyclododecane and 50 milliliters of methylene chloride there is slowly added, at 24° C. and with stirring, a solution containing 2.3 grams (0.0158 mole) sulfuryl chloride and 10 milliliters of methylene chloride. During the addition of this solution the slurry turns into a solution. The reaction is followed by gas chromatographic analysis of samples removed from the reaction mixture. When analysis of these samples indicates the absence of 1,1-bis(3-methyl-4-hydroxyphenyl)cyclododecane the solution is stripped on a rotary evaporator under water aspirator vacuum. The resultant solids are recrystallized from methanol. These recrystallized solids have a melting point of 213°–215° C. and a gas chromatographic retention time of 28.76 minutes relative to a retention time of 14.04 minutes for p-cumyl phenol.

EXAMPLE 6

This example illustrates the preparation of 1,1-bis(3-chloro-5-methyl-4-hydroxyphenyl) cyclopentadecane.

To a solution containing 0.07 gram (0.000166 mole) of 1,1-bis(3-methyl-4-hydroxyphenyl)cyclopentadecane and 5 milliliters of methylene chloride there is slowly added, with stirring, a solution containing 0.08 gram (0.0006 mole) sulfuryl chloride and 5 milliliters of methylene chloride. The reaction is followed by gas chromatographic analysis of samples removed from the reaction mixture. When analysis of these samples indicates the absence of 1,1-bis(3-methyl-4-hydroxyphenyl) cyclopentadecane the solution is stripped on a rotary evaporator under water aspirator vacuum. The resultant solids are recrystallized with methanol. The recrystallized solids have a melting point of 185°–187° C. and a gas chromatographic retention time of 30.22 minutes relative to p-cumyl phenol which emerges at 13.97 minutes.

The polymers of the instant invention are useful in the production of sheets, films, molded articles, and the like.

Obviously, other modifications and variations of the present invention are possible in light of the above teachings. It is, therefore, to be understood that changes may be made in the particular embodiments of the invention described and claimed which are within the full intended scope of the invention as defined by the appended claims.

What is claimed is:

1. High molecular weight, aromatic, thermoplastic, linear copolyester-carbonate resin which comprises the polymeric reaction products of
   (a) a carbonate precursor;
   (b) at least one dihydric phenol represented by the general formula

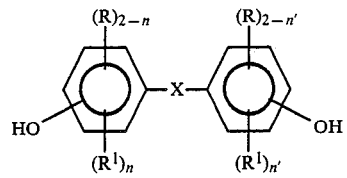

wherein
R is independently selected from hydrogen or lower alkyl radicals,
$R_1$ is independently selected from halogen radicals,
X is selected from monocyclic cycloalkylidene radicals containing from 12 to about 16 ring carbon atoms, and n and n' are independently selected from whole numbers having a value of from 0 to 2 inclusive, with the proviso that the sum of n plus n' is at least one; and
(c) at least one difunctional carboxylic acid or an ester forming reactive derivative thereof.

2. The resin of claim 1 wherein both n and n' are at least one.

3. The resin of claim 2 wherein said dihydric phenol (b) is represented by the general formula

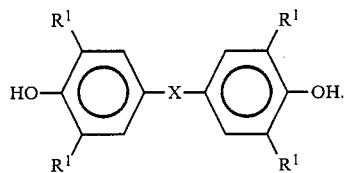

4. The resin of claim 1 wherein said ester forming reactive derivative is selected from isophthaloyl dichloride, terephthaloyl dichloride, or mixtures thereof.

5. The resin of claim 4 wherein said carbonate precursor is phosgene.

6. The resin of claim 1 wherein said resin comprises the polymeric reaction products of (a), (b), (c) and (d) at least one dihydric phenol represented by the general formula

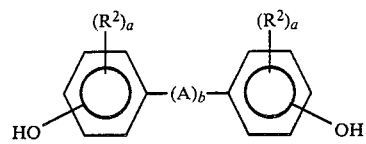

wherein
$R^2$ is independently selected from halogen radicals, monovalent hydrocarbon radicals, or monovalent hydrocarbonoxy radicals,
A is selected from alkylene radicals, alkylidene radicals, cycloalkylene and cycloalkylidene radicals containing from 4 to 6 ring carbon atoms, —S—, —S—S—, —O—,

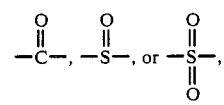

a is independently selected from whole numbers having a value of from 0 to 4 inclusive, and
b is either zero or one.

7. The resin of claim 6 wherein said dihydric phenol (a) is bisphenol-A.

8. The resin of claim 7 wherein said carbonate precursor is phosgene.

9. A copolyester-carbonate composition exhibiting improved heat resistance comprising:

(i) an amount effective to improve the heat resistance of said composition of at least one high molecular weight, aromatic, thermoplastic, linear copolyester-carbonate resin which comprises the polymeric reaction products of
(a) a carbonate precursor,
(b) at least one dihydric phenol represented by the general formula

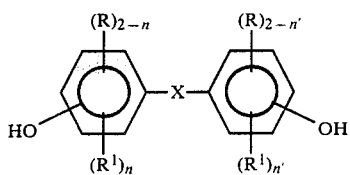

wherein
R is independently selected from hydrogen or lower alkyl radicals,
$R^1$ is independently selected from halogen radicals,
X is selected from monocyclic cycloalkylidene radicals containing from 12 to about 16 ring carbon atoms, and n and n' are independently selected from whole numbers having a value of from 0 to 2 inclusive, with the proviso that the sum of n plus n' is at least one, and
(c) at least one difunctional carboxylic acid or an ester forming reactive derivative thereof; and (ii) at least one copolyester-carbonate resin which comprises the polymeric reaction products of
(d) a carbonate precursor,
(e) at least one difunctional carboxylic acid or an ester forming reactive derivative thereof, and
(f) at least one dihydric phenol represented by the general formula

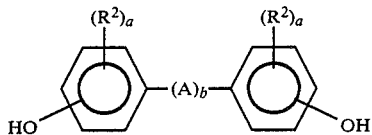

wherein
$R^2$ is independently selected from halogen radicals, monovalent hydrocarbon radicals, or monovalent hydrocarbonoxy radicals,
A is selected from alkylene radicals, alkylidene radicals, cycloalkylene or cycloalkylidene radicals containing from 4 to 6 ring carbon atoms, —S—, —S—S—, —O—,

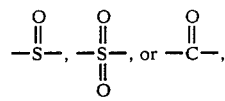

a is independently selected from whole numbers having a value of from 0 to 4 inclusive, and
b is either zero or one.

10. The composition of claim 9 wherein said ester forming reactive derivative is selected from isophthaloyl dichloride, terephthaloyl dichloride, or mixtures thereof.

11. The composition of claim 10 wherein said carbonate percursor is phosgene.

12. The composition of claim 11 wherein said dihydric phenol (a) is bisphenol-A.

13. The composition of claim 9 wherein both n and n' are at least one.

14. The composition of claim 13 wherein said dihydric phenol (b) is represented by the general formula

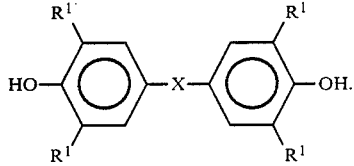

* * * * *